US012784460B2

(12) United States Patent
Han et al.

(10) Patent No.: US 12,784,460 B2
(45) Date of Patent: Nov. 3, 2026

(54) DIFFERENTIABLE RENDERING AND EVOLUTION STRATEGIES FOR LANDMARK DETECTION AND MATCHING UNDER UNCERTAINTY

(71) Applicant: NEC Laboratories America, Inc., Princeton, NJ (US)

(72) Inventors: Shaobo Han, Princeton, NJ (US); Ming-Fang Huang, Princeton, NJ (US); Tingfeng Li, Plainsboro, NJ (US); Yuheng Chen, South Brunswick, NJ (US); Zhuowei Li, Piscataway, NJ (US)

(73) Assignee: NEC Corporation (JP)

( * ) Notice: Subject to any disclaimer, the term of this patent is extended or adjusted under 35 U.S.C. 154(b) by 198 days.

(21) Appl. No.: 18/901,822

(22) Filed: Sep. 30, 2024

(65) Prior Publication Data

US 2025/0124716 A1 Apr. 17, 2025

Related U.S. Application Data

(60) Provisional application No. 63/590,866, filed on Oct. 17, 2023, provisional application No. 63/590,877, filed on Oct. 17, 2023.

(51) Int. Cl.

| | |
|---|---|
| ***G06V 20/56*** | (2022.01) |
| ***G06T 11/23*** | (2026.01) |
| ***G06V 10/80*** | (2022.01) |
| ***G06V 20/00*** | (2022.01) |

(52) U.S. Cl.
CPC .............. *G06V 20/56* (2022.01); *G06T 11/23* (2026.01); *G06V 10/811* (2022.01); *G06V 20/38* (2022.01)

(58) Field of Classification Search
CPC ...... G06T 11/23; G06V 10/811; G06V 20/38; G06V 20/56
See application file for complete search history.

(56) References Cited

U.S. PATENT DOCUMENTS

| | | | | |
|---|---|---|---|---|
| 12,417,558 | B2 * | 9/2025 | Hertzmann | G06T 11/00 |
| 12,592,770 | B2 * | 3/2026 | Brenne | G01D 5/35358 |
| 2018/0340801 | A1 * | 11/2018 | Kelley | B61L 25/021 |
| 2021/0312801 | A1 * | 10/2021 | Ji | G06T 11/23 |
| 2023/0028676 | A1 * | 1/2023 | Huang | G01H 9/004 |
| 2025/0022193 | A1 * | 1/2025 | Zhang | G06T 11/23 |

* cited by examiner

*Primary Examiner* — Boubacar Abdou Tchoussou
(74) *Attorney, Agent, or Firm* — Vincent Duffy

(57) ABSTRACT

Disclosed is a stroke-based differentiable rendering for both representation of spatiotemporal sensor data and unsupervised spatiotemporal events detection wherein we encode DAS waterfall data into a structured latent space based on parameterized brushstrokes. The structured brushstroke representation can (1) suppress background noise and distracting clutters from the original waterfall data, (2) allow easy leverage of geometrical prior knowledge for physics-informed pattern recognition. Guided by multiple specially designed targets that emphasize different aspects of the original data, the optimized strokes not only preserve the salient information, but also align well with the original data in terms of spatial and temporal coordinates. As a results, it also provides pixel-level annotation as a byproduct. Based on long term DFOS data and cumulative statistics, we can further localize landmarks (such as traffic lights, manholes, etc.) from the waterfall data. These landmarks can be used for cable mapping.

5 Claims, 25 Drawing Sheets

| Property | Ours | Others |
|---|---|---|
| Space | stroke | pixel |
| Geometric-aware | √ | X |
| Physical-informed | √ | X |
| Vector Form | √ | X |
| Sparsity | √ | X |

FIG. 8

| | CO | M1 | M2 | P1 | P2 | P3 | M3 | M4 | M5 |
|---|---|---|---|---|---|---|---|---|---|
| CO | 1 | | | | | | | | |
| Ma | | | 1 | | | | | | |
| Pa | | | | 1 | | | | | |
| Pb | | | | | | 1 | | | |
| Mb | | | | | | | 1 | | |
| Mc | | | | | | | | 1 | |

FIG. 13

```
// Forward Pass
Generate a M x N parameter matrix
Generate a population of samples,
For m = 1:M detected landmark,
        Construct dynamic mask based on distance, last assigned symbol, and type
compatibility
        Hadamard product on the mask
        Assignment by drawing categorical variables
Get an assignment
// Evaluate fitness
Discretize the routes, and evaluate with loss function
// Optimization
Select the best subset of individuals and use them to update the parameter matrix,
weighted by the fitness
```

FIG. 20(A)

DIFFERENTIABLE RENDERING AND EVOLUTION STRATEGIES FOR LANDMARK DETECTION AND MATCHING UNDER UNCERTAINTY

CROSS-REFERENCE TO RELATED APPLICATIONS

This application claims the benefit of U.S. Provisional Patent Application Ser. No. 63/590,877 filed Oct. 17, 2023, and U.S. Provisional Patent Application Ser. No. 63/590,866 filed Oct. 17, 2023, the entire contents of each of which is incorporated by reference as if set forth at length herein.

FIELD OF THE INVENTION

This application relates generally to distributed fiber optic sensing (DFOS) systems, methods, structures, and related technologies. More particularly, it pertains to differentiable rendering and evolution strategies for landmark detection and matching under uncertainty.

BACKGROUND OF THE INVENTION

Distributed fiber optic sensing (DFOS) systems, methods, and structures have found widespread utility in contemporary industry and society. Of particular importance, DFOS techniques have been used to usher in a new era of monitoring including perimeter security, traffic monitoring, and civil infrastructure monitoring.

DFOS systems and methods generate a digital representation of the physical world in the format of 2D spatiotemporal arrays, where x-axis denotes location and y-axis denotes the time. The entry of the matrix denotes the value of physical parameters. Due to the nature of distributed sensors and the associated vibration or acoustic events, the individual entries are not independent but correlated. Accordingly, if we visualize the 2D spatiotemporal array as an image, it shows meaningful spatiotemporal patterns corresponding to meaningful events such as traffic trace.

It is of interest to turn low-level raw sensory input into a high-level, structured representation of major spatiotemporal events, which (1) concisely summarize the salient information of the original data and more interpretable to human (2) facilitate unsupervised machine learning based on physical or geometrical domain knowledge. These requires converting the image from the original pixel space to into a new trace sequences space. Moreover, the new representation need to (1) have enough capacity to represent spatiotemporal patterns typically seen within sensing data, and (2) maintain controllability being able to incorporate various physically plausible or geometrical constraints

SUMMARY OF THE INVENTION

An advance in the art is made according to aspects of the present disclosure directed to a stroke-based differentiable rendering for both representation of spatiotemporal sensor data and unsupervised spatiotemporal events detection. Due to the scarcity of annotations and domain shifts, supervised learning becomes challenging. In this work, we encode the DAS waterfall data into a structured latent space based on parameterized brushstrokes.

The structured brushstroke representation can (1) suppress background noise and distracting clutters from the original waterfall data, (2) allow easy leverage of geometrical prior knowledge for physics-informed pattern recognition. Guided by multiple specially designed targets that emphasize different aspects of the original data, the optimized strokes not only preserve the salient information, but also aligns well with the original data in terms of spatial and temporal coordinates. As a results, it also provides pixel-level annotation as a byproduct.

For spatiotemporal eve event detection, we demonstrate the ability of the proposed method to detect vehicle stop-and-go events and driving-across-manholes events within the waterfall data using a fully unsupervised approach. Based on long term DFOS data and cumulative statistics, we can further localize landmarks (such as traffic lights, manholes, etc.) from the waterfall data. These landmarks can be used for cable mapping.

We convert the spatiotemporal sensing data from dense format to sparse format. The data is represented as a sequence of parameterized brushstrokes instead of raw pixels. We use Bezier curves (color represents the intensity information and shape indicates the type of events). We use a pre-trained foundation model based perceptual loss to bridge the domain gap between the raw sensory image and the abstract sketches. In particular, we use early (lower) layers of the model to emphasis more about the spatiotemporal alignment rather than sematic meaning. We designed multiple targets by data transformation to emphasize different aspects needed to preserve in the rasterized image (edges, skeleton, intensities, etc.).

We use a differentiable render or rasterizer to allow gradient-based optimization on the input parameters. We use a decoder-only architecture and iterative optimization. Iterative optimization effectively avoids the amortization gap commonly seen in the encoders or recognition models.

BRIEF DESCRIPTION OF THE DRAWING

FIG. 8 is a tabular representation illustrating differences between the instant method of the present disclosure and other methods according to aspects of the present disclosure.

FIG. 13 is a schematic diagram showing an illustrative assignment matrix according to aspects of the present disclosure.

FIG. 20(A) and FIG. 20(B) show landmark matching based on evolutionary strategies in which: FIG. 20(A) is a is a pseudocode listing; and FIG. 20(B) is a flow diagram of ES-based landmark matching, according to aspects of the present disclosure.

DETAILED DESCRIPTION OF THE INVENTION

Figure 1A:
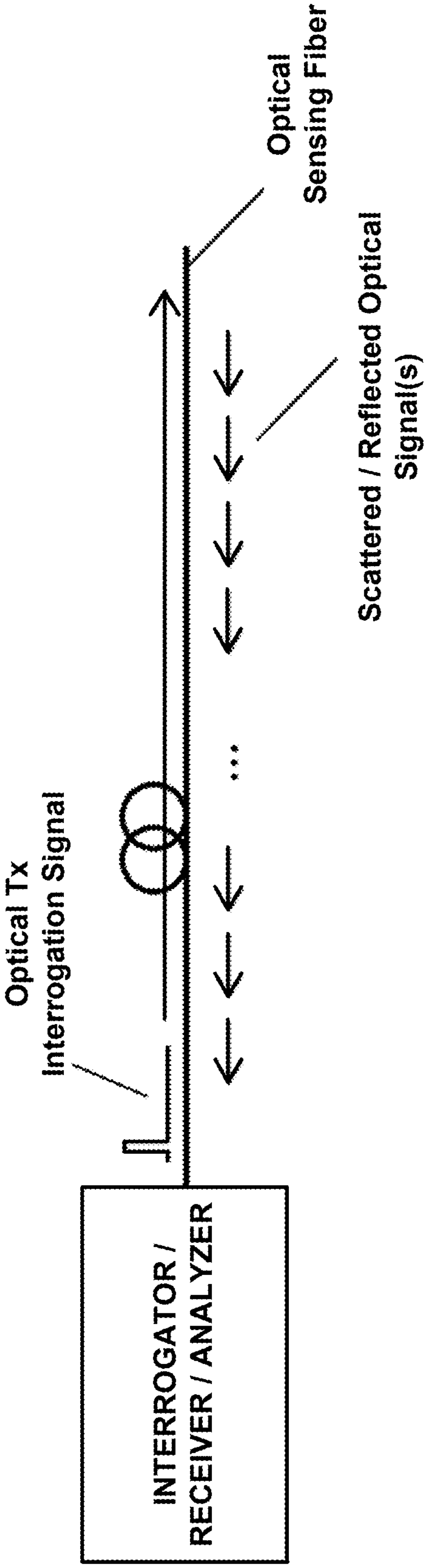
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems convert the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
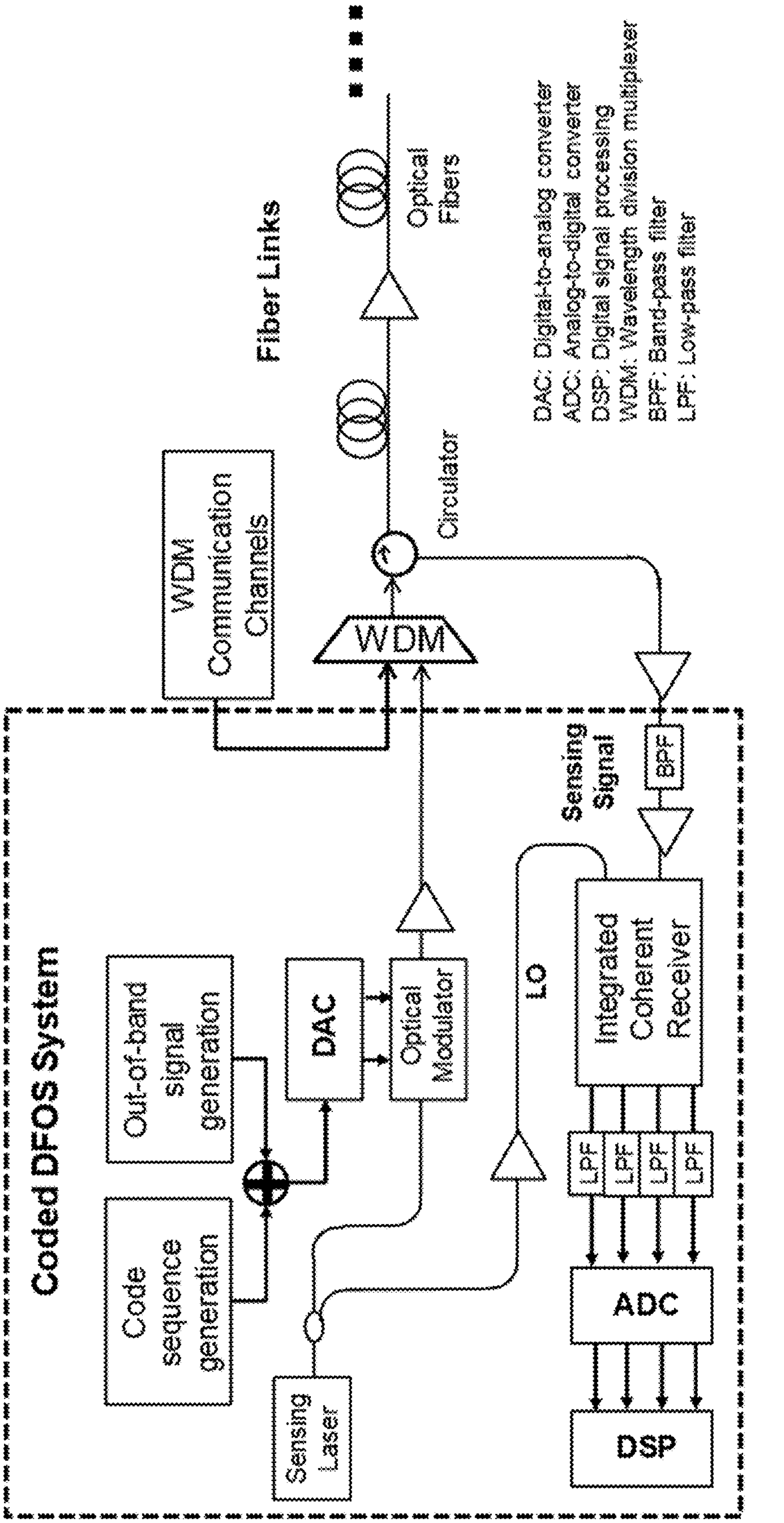

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Of particular interest, distributed acoustic sensing (DAS) is a technology that uses fiber optic cables as linear acoustic sensors. Unlike traditional point sensors, which measure acoustic vibrations at discrete locations, DAS can provide a continuous acoustic/vibration profile along the entire length of the cable. This makes it ideal for applications where it's important to monitor acoustic/vibration changes over a large area or distance.

Distributed acoustic sensing/distributed vibration sensing (DAS/DVS), also sometimes known as just distributed acoustic sensing (DAS), is a technology that uses optical fibers as widespread vibration and acoustic wave detectors. Like distributed temperature sensing (DTS), DVS allows for continuous monitoring over long distances, but instead of measuring temperature, it measures vibrations and sounds along the fiber.

DVS operates as follows.

Light pulses are sent through the fiber optic sensor cable.

As the light travels through the cable, vibrations and sounds cause the fiber to stretch and contract slightly.

These tiny changes in the fiber's length affect how the light interacts with the material, causing a shift in the backscattered light's frequency.

By analyzing the frequency shift of the backscattered light, the DAS/DVS system can determine the location and intensity of the vibrations or sounds along the fiber optic cable.

Similar to DTS, DAS/DVS offers several advantages over traditional point-based vibration sensors: High spatial resolution: It can measure vibrations with high granularity, pinpointing the exact location of the source along the cable; Long distances: It can monitor vibrations over large areas, covering several kilometers with a single fiber optic sensor cable; Continuous monitoring: It provides a continuous picture of vibration activity, allowing for better detection of anomalies and trends; Immune to electromagnetic interference (EMI): Fiber optic cables are not affected by electrical noise, making them suitable for use in environments with strong electromagnetic fields.

DAS/DVS technology has a wide range of applications, including: Structural health monitoring: Monitoring bridges, buildings, and other structures for damage or safety concerns; Pipeline monitoring: Detecting leaks, blockages, and other anomalies in pipelines for oil, gas, and other fluids; Perimeter security: Detecting intrusions and other activities along fences, pipelines, or other borders; Geophysics: Studying seismic activity, landslides, and other geological phenomena; and Machine health monitoring: Monitoring the health of machinery by detecting abnormal vibrations indicative of potential problems.

As the technology continues to develop, DAS/DVS is expected to become even more widely used in various fields where continuous and sensitive acoustic/vibration monitoring is crucial.

With the above in mind, we note that a motivating application of systems and methods according to aspects of the present disclosure is landmark detection for automatic cable mapping. The landmarks are used as anchor points to bridge the physical world GPS coordinates and the column index in the digital data recorded by the DFOS sensors.

A key idea is to use structure representation based on cubic Bezier curves to represent the waterfall data and spatiotemporal events, with main advantages including: Expressive, flexible enough to represent DAS trace patterns; Interpretable, vehicle speed and acceleration can be seen from the slopes of the trace and curvatures; and Differentiable, the input parameter can be easily optimized using gradient-based optimization.

Figure 2:
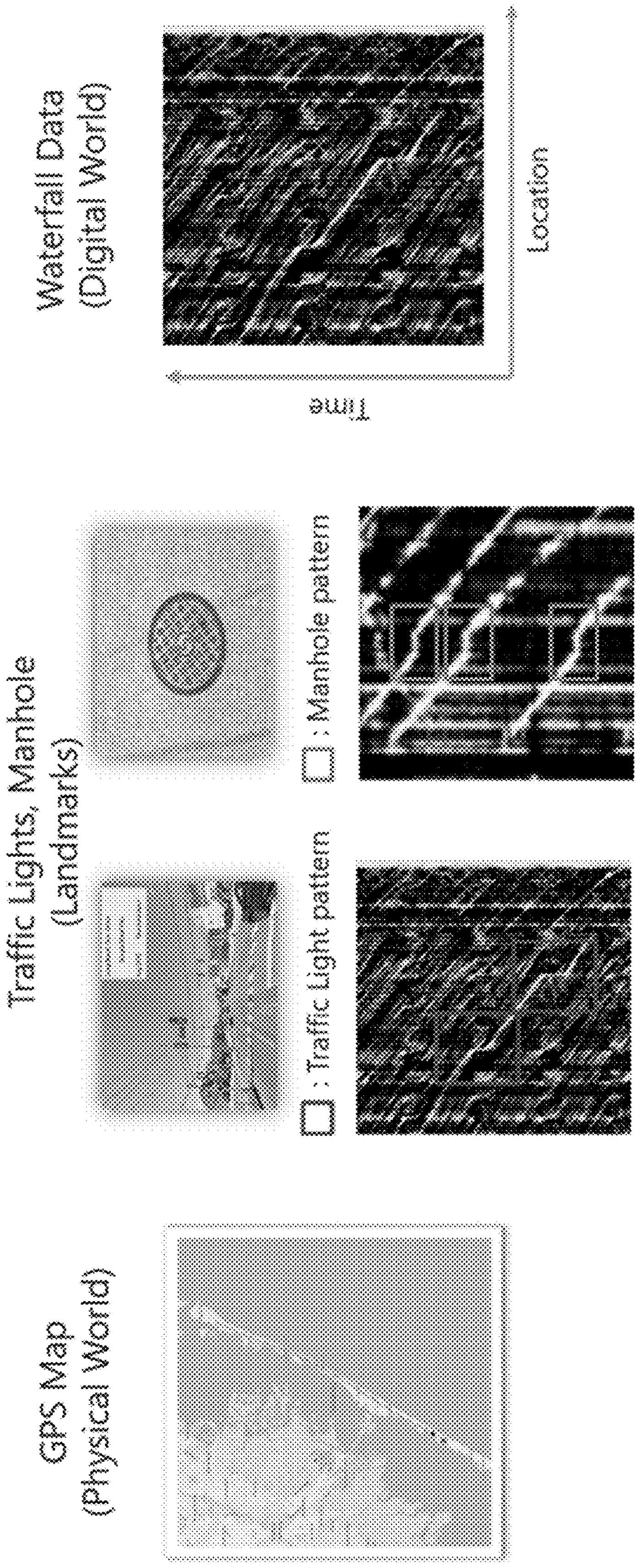
FIG. 2 is a schematic diagram showing illustrative landmark localization based on frequently occurred events such as stop-and-go traffic around lights and traffic trace broken around manholes for cable mapping. GPS coordinates on a GIS map are linked to distance on the sensing data according to aspects of the present disclosure.

FIG. 2 is a schematic diagram showing illustrative landmark localization based on frequently occurred events such as stop-and-go traffic around lights and traffic trace broken around manholes for cable mapping. GPS coordinates on a GIS map are linked to distance on the sensing data according to aspects of the present disclosure.

Figure 3:
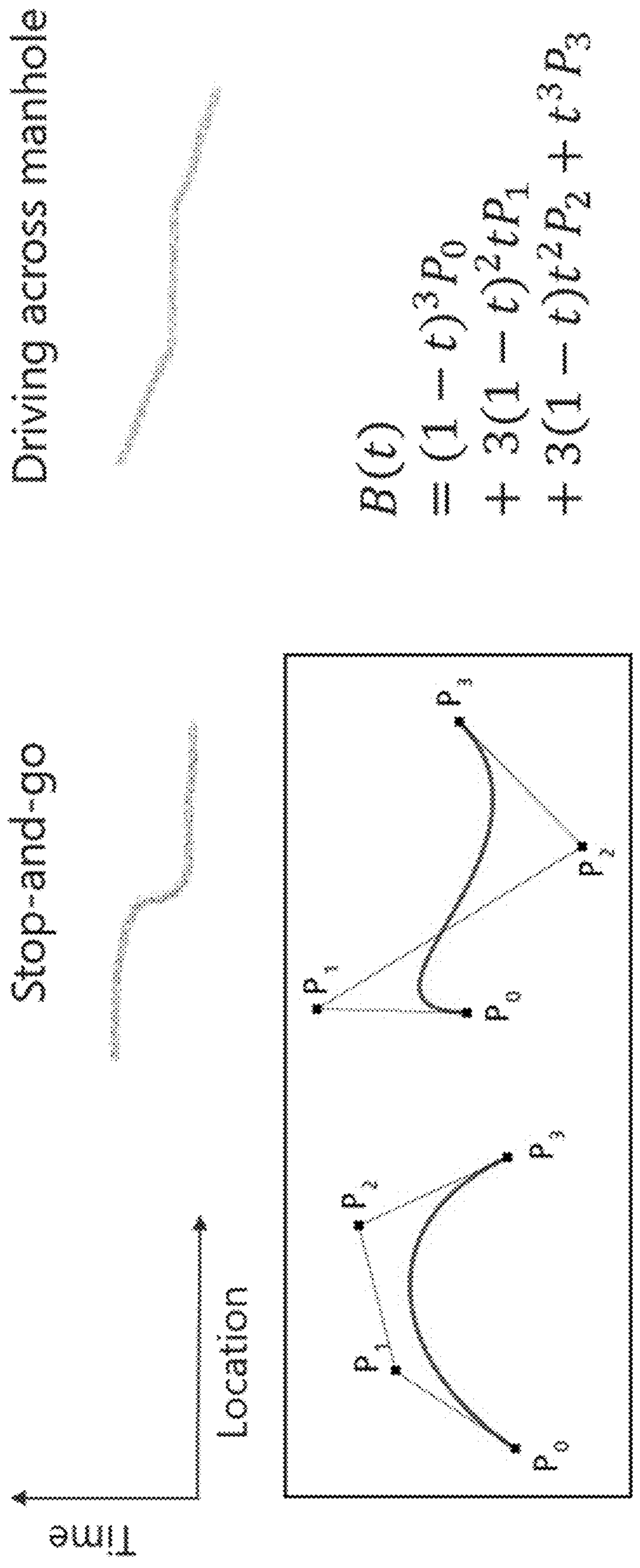
FIG. 3 is a schematic flow diagram showing illustrative use of cubic Bezier curves as a parameterized representation of DAS traces according to aspects of the present disclosure.

FIG. 3 is a schematic flow diagram showing illustrative use of cubic Bezier curves as a parameterized representation of DAS traces according to aspects of the present disclosure.

Figure 4:
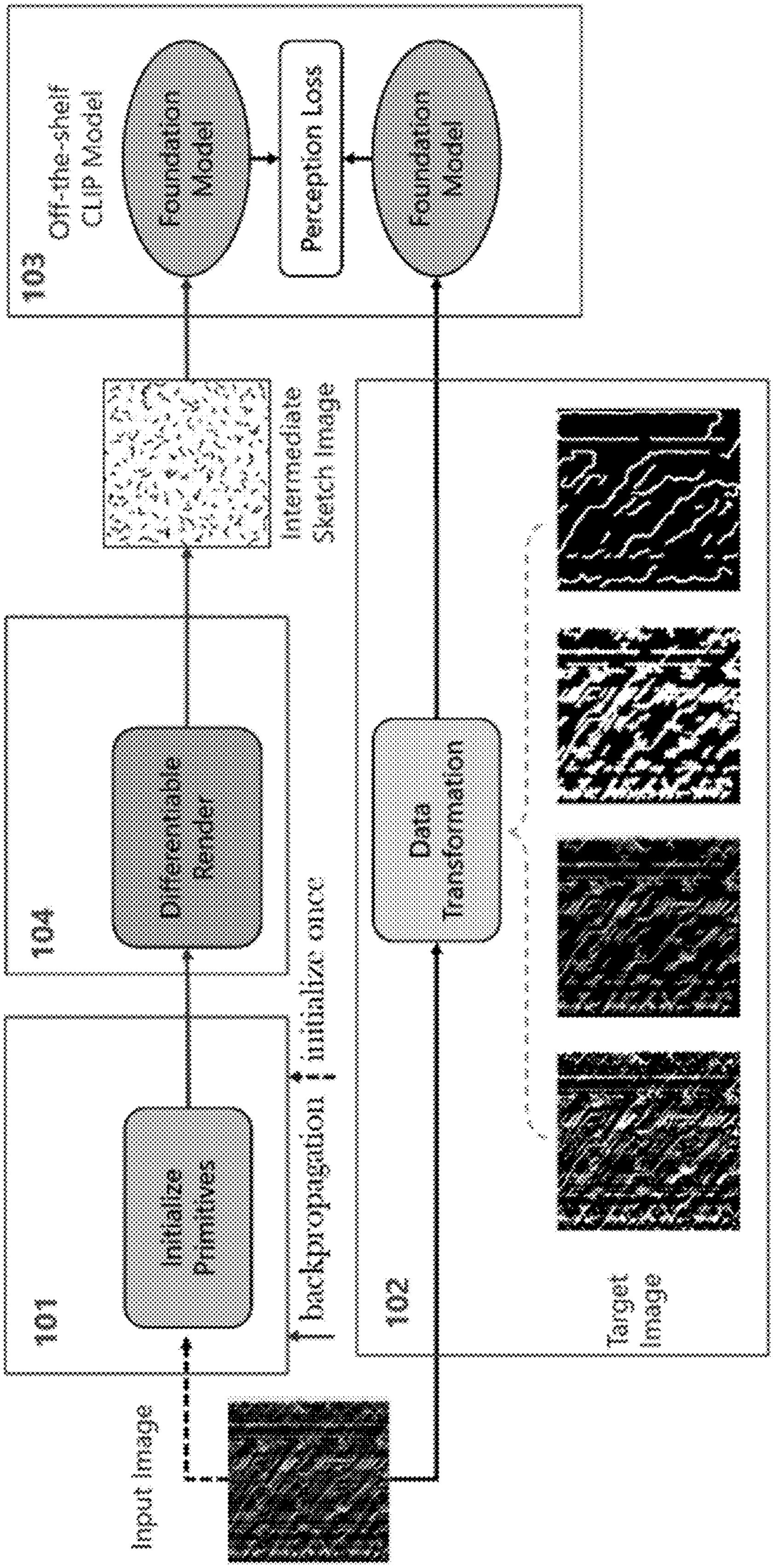
FIG. 4 is a schematic block diagram showing illustrative overall method architecture including saliency-based initialization, target design, loss function, and differentiable render or rasterizer according to aspects of the present disclosure.

FIG. 4 is a schematic block diagram showing illustrative overall method architecture including saliency-based initialization, target design, loss function, and differentiable render or rasterizer according to aspects of the present disclosure.

Step 1: Data Preprocessing

Read Waterfall data as grey-scale image array, crop patches from whole waterfall, resize and normalize image according to the requirements of the foundation neural network model (for example, Resnet-18 model requires input size to be 224×224).

Step 2: Saliency-Guided Initialization of Primitives [101]

Divide each image into 16×16 grids and each grid random initialize 3 strokes. Each stroke is parameterized a Cubic Bezier curve (with 4 control points) and one additional parameter for the intensity.

Step 3: Targets Design [102]

We prepare a set of target images from original input image. Here we include for data transformation operations to generate 4 targets.

Binarize original input data according to the Ostu method and remove small components whose pixels count less than 20 to emphasize the major salient traces of interest.

Generated an image masked by mask generated from (1) to emphasize the spatiotemporal alignment.

Generate a skeleton image from (1) as target to emphasize the shape of the vibration pattern such as speed, acceleration of vehicles on the spatiotemporal map Use original image as target.

Step 4: The Choice of Loss Functions [103]

The loss function is generated through perception loss. Specifically, we use latent representations from first three layers of Vit-B/16 model from CLIP and measure average L2 distance. We found that the averaged L2 distance is also helpful for the spatiotemporal alignment.

Step 5: Iterative Optimization Through the Differentiable Render [104]

In the forward process, initialized primitives are passed through a differentiable render to generate a 2d image as the generated image. The render R(S)=I, is a function that maps parameters S to pixel images I using rasterization. The generated image is then compared to the four designed targets. The discrepancy is described by the loss function and optimized using gradient descent method (1000-2000 iterations needed for convergence, which takes wall time of 2-3 minutes). After optimization, we get a set of strokes parameterized by a set of cubic Bezier curves. Each curve has four parameters related to the control points, and one parameter represents transparency.

Step 6: Post-Processing

Then we do the following post-processing steps to further clean it up.

In the stroke-space strokes whose transparency is below 0.45 or length less than 10 are first removed. Next, a skeleton is generated for each of the connected components and a DAG is created for each component with start point from most upper-left corner. Finally, the longest path is found within the graph to represent the trajectory.

Figure 5:
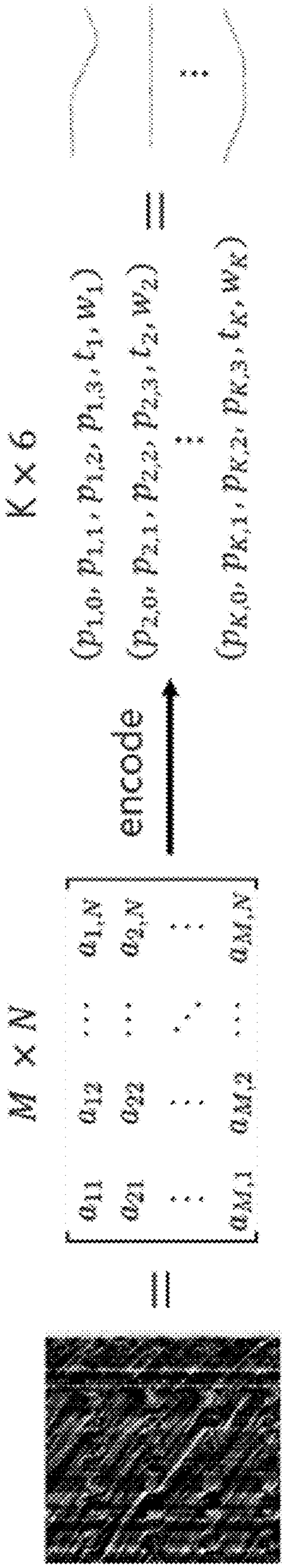
FIG. 5 is a schematic block diagram showing an illustrative dense to sparse encoding of spatiotemporal sensing data that leads to structured representation according to aspects of the present disclosure.

FIG. 5 is a schematic block diagram showing an illustrative dense to sparse encoding of spatiotemporal sensing data that leads to structured representation according to aspects of the present disclosure. FIG. 5 summarizes the procedure of seeking more structured representation of spatiotemporal data from distributed sensors. The sequence of stroke representation is more amendable for processing based on the needs of the downstream tasks. In the next, we will showcase the unsupervised event detection based on explicit geometrical knowledge.

Step 7: Unsupervised Spatiotemporal Event Detection

For stop-and-go pattern of vehicles: for each component (pruned skeleton) from post-processed image, the gradient dx/dy is computed and create a 1-dimension signal. The detected peak corresponds to an “S” pattern.

For vehicle-passing-manhole: Similarly, gradient dy/dx is computed and peak detected in a similar way. Note that it may be a cave rather than a peak depending on the driving direction of the vehicle.

Figure 6:
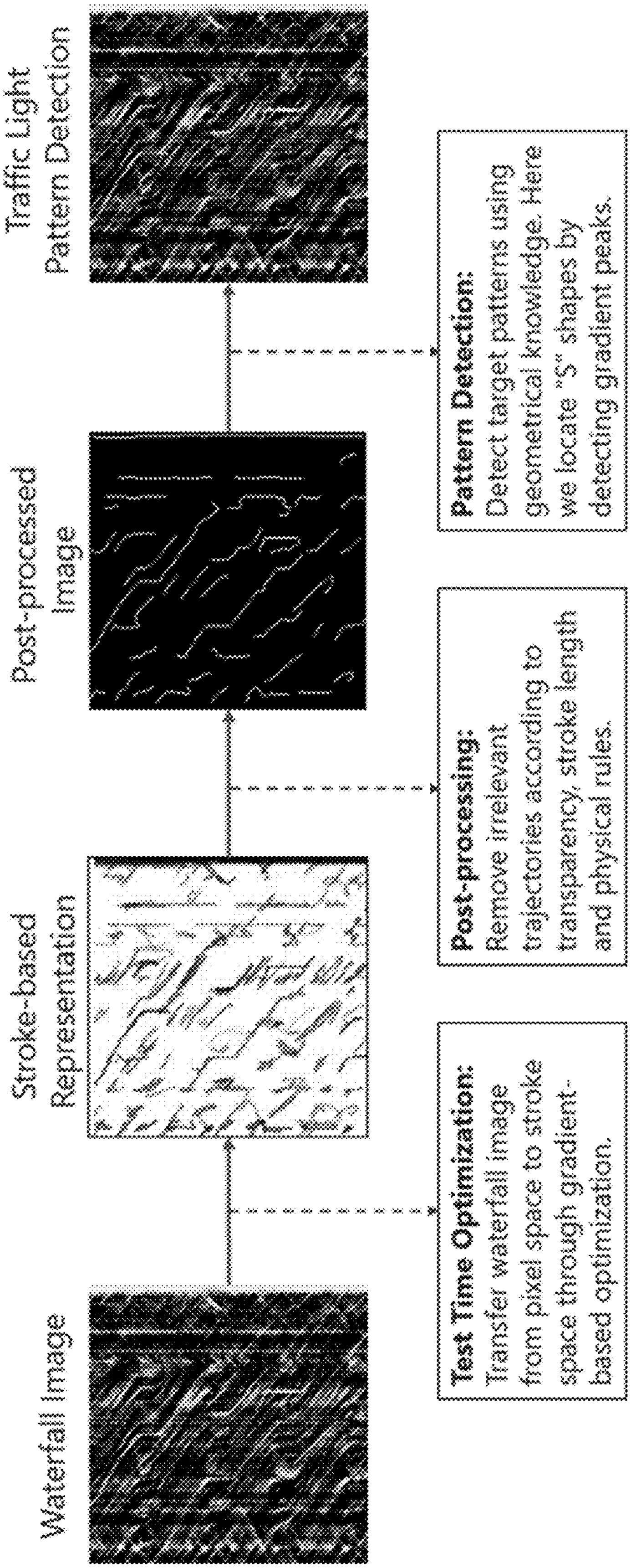
FIG. 6 is a schematic flow diagram showing illustrative data processing and intermediate results according to aspects of the present disclosure.

FIG. 6 is a schematic flow diagram showing illustrative data processing and intermediate results according to aspects of the present disclosure.

Figure 7:
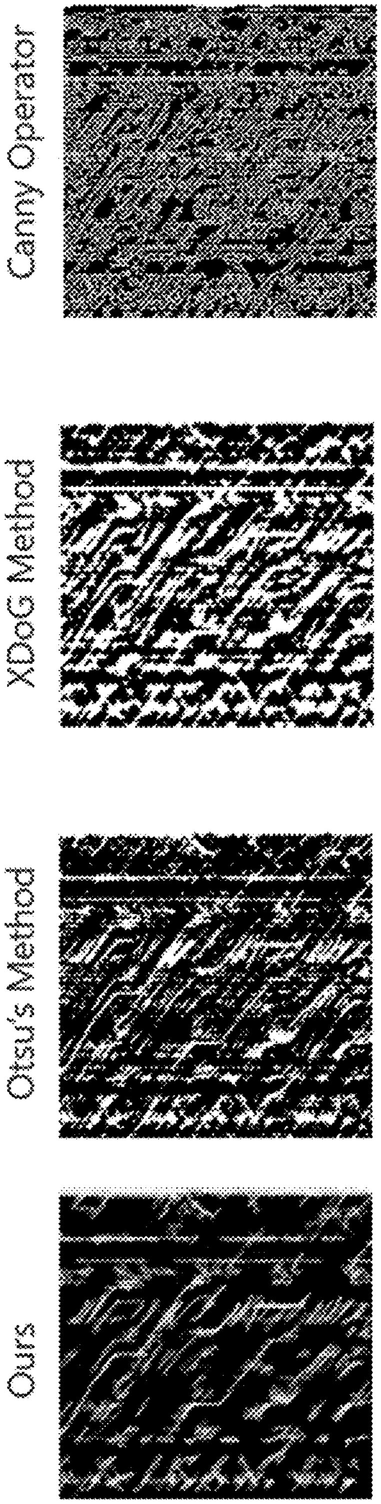
FIG. 7 is a schematic diagram showing illustrative comparisons between image processing methods according to aspects of the present disclosure.

FIG. 7 is a schematic diagram showing illustrative comparisons between image processing methods according to aspects of the present disclosure.

We compare our method to other unsupervised methods in computer vision and image processing, such as image banalization (Otsu’s method) and edge detection methods including XDoG method or Canny operator, as shown in FIG. 7.

Our method provides better qualitative performance. First, our method is more robust to background noise. Second, our method provides parameterized representation that allows for incorporating physics or geometric constraints, while other methods stay in the pixel space. Third, our method offers more sparse representation and costs less in data storage. The differentiation is summarized in FIG. 8, which is a tabular representation illustrating differences between the instant method of the present disclosure and other methods according to aspects of the present disclosure.

Figure 9:
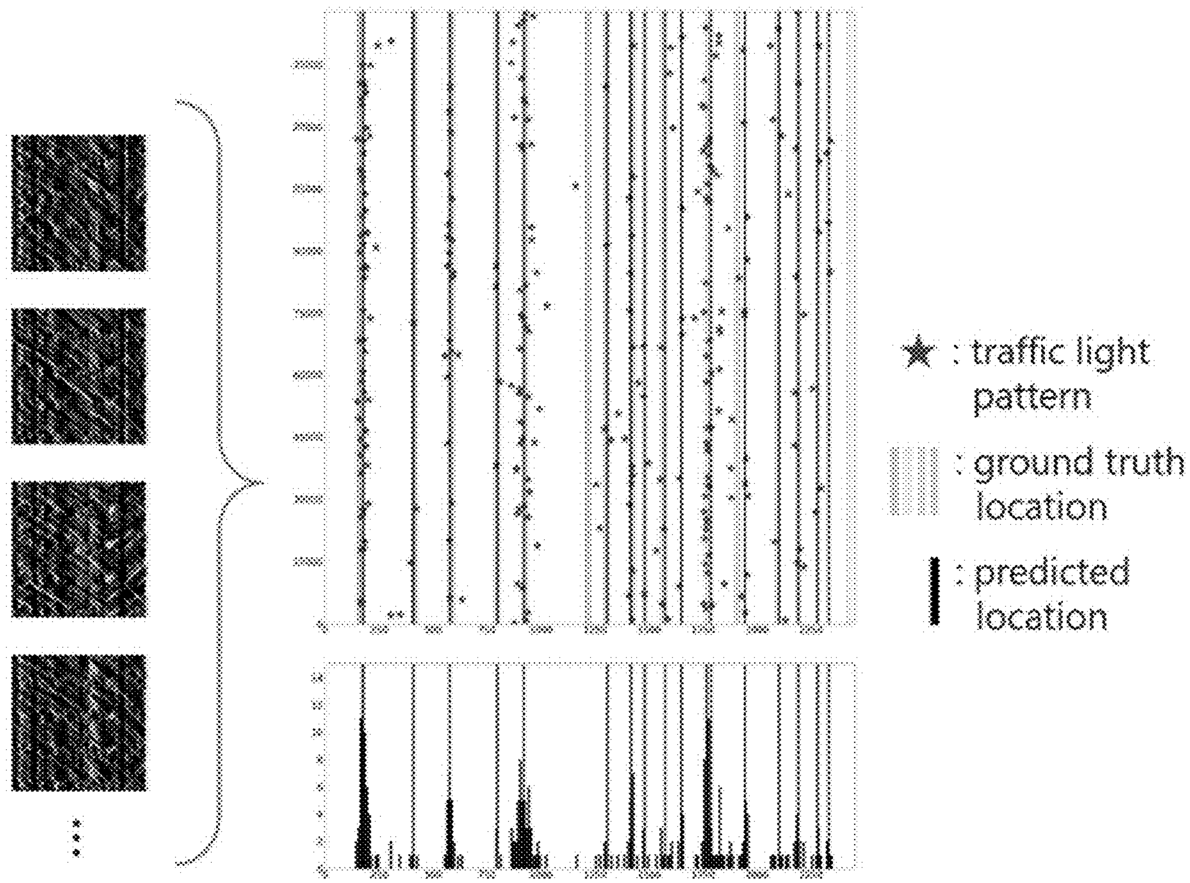
FIG. 9 is a schematic diagram showing an illustrative implementation of a traffic light localization according to aspects of the present disclosure.

FIG. 9 is a schematic diagram showing an illustrative implementation of a traffic light localization according to aspects of the present disclosure.

Figure 10:
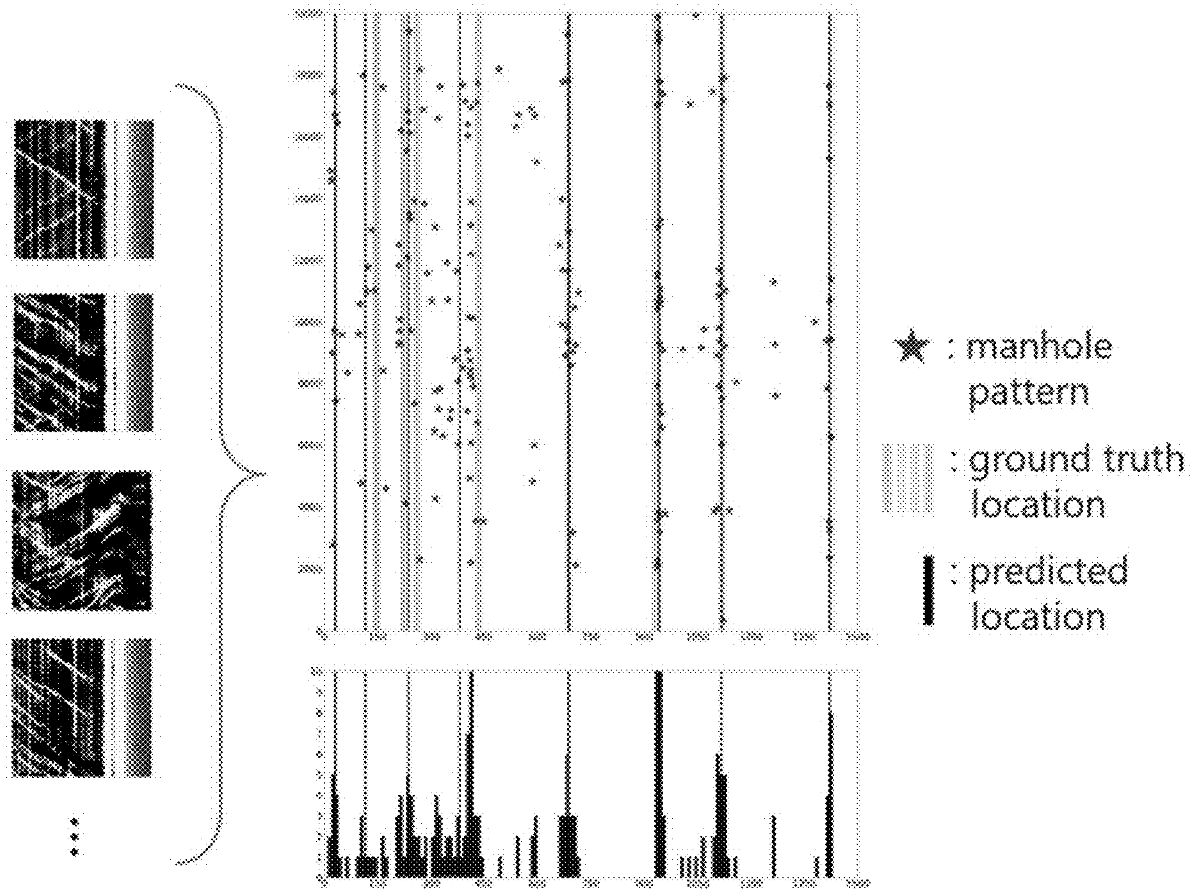
FIG. 10 is a schematic diagram showing an illustrative implementation of a manhole localization according to aspects of the present disclosure.

FIG. 10 is a schematic diagram showing an illustrative implementation of a manhole localization according to aspects of the present disclosure.

In these two implementations shown, we present our method on real-world sensing dataset, going from event detection to landmark localization. Traffic lights are associated with the stop-and-go S-shaped pattern, while manholes are associated with the broken traffic trace pattern. Leveraging long-term collected data of a few hours, the location of landmarks shows more spatiotemporal events of interest.

Figure 11:
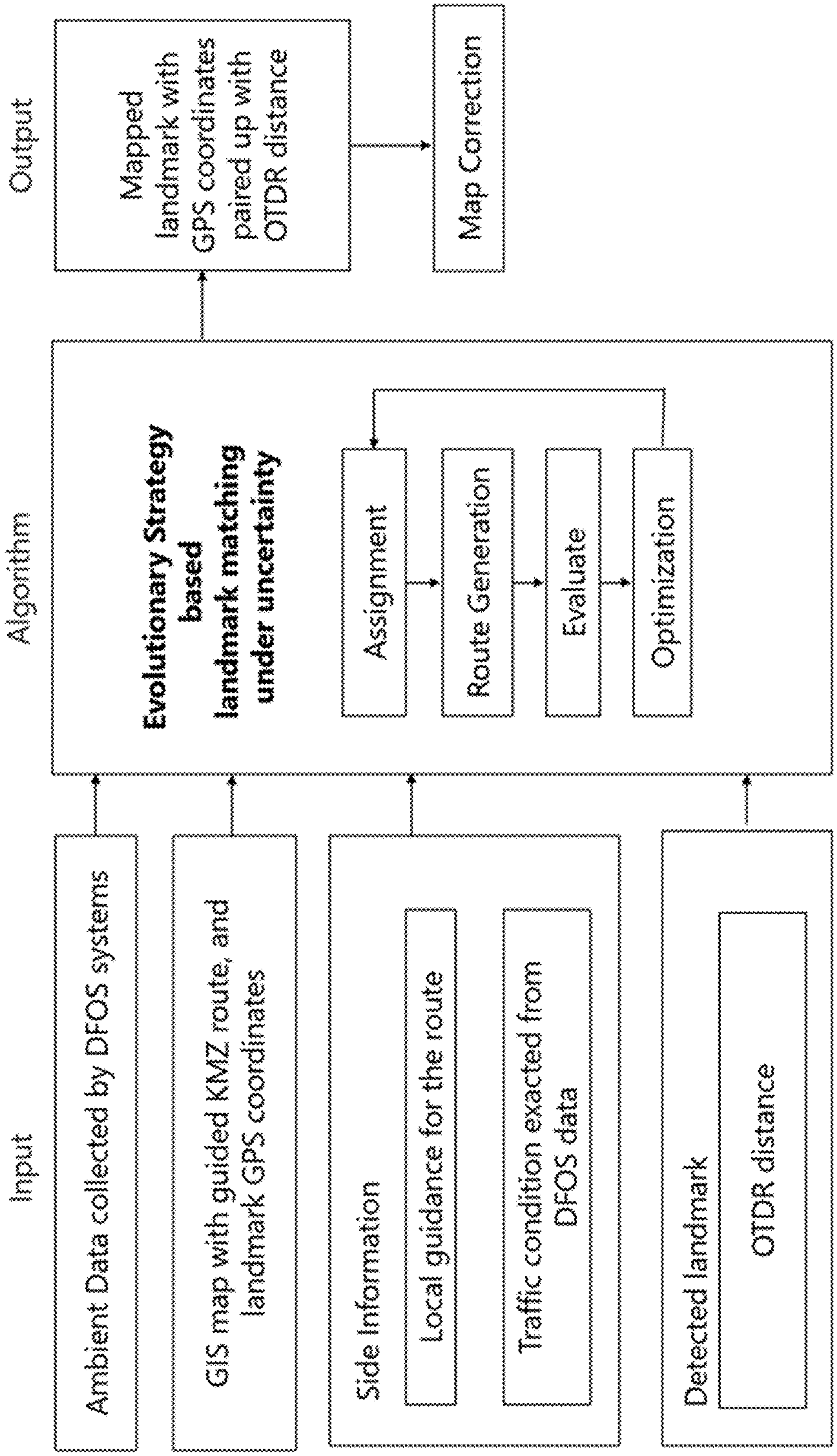
FIG. 11 is a schematic block diagram showing an illustrative overall system architecture according to aspects of the present disclosure.

FIG. 11 is a schematic block diagram showing an illustrative overall system architecture according to aspects of the present disclosure.

We now turn our attention to the problem of Geo-localization.

Geo-localization is a prerequisite for fiber sensing application in the real-world based on distributed fiber-optic sensing (DFOS) systems. Traditionally, the process can be done by matching landmarks identified from the OTDR traces to the GIS map. The design choices are, whether requires active or passive source, whether the landmarks densely covering the route, or only a small set of special locations and the rest locations are calculated, whether the matching process tolerant uncertainty and inaccuracies from the GIS map.

Previous work has been based on either (1) tapping test in the field, which is very labor-intensive, thus it is not practical, for large-scale deployment of fiber sensing application, or (2) GPS-tracked moving sources (e.g., vehicle), driving along the fiber route is less time consuming, but tracking the vehicle on the DFOS data requires efforts. Moreover, if we do not have a 100% accurate map of the route, or some part of the route is not accessible (such as aerial cables in the middle of a buried route) we will easily lose track of a target. Oftentimes, the map for the cable route provided by vendors can be up to 20% inaccurate. The usual convention is to figure out which portion of the route is inaccurate and correct them by repetitive manual comparison or additional field experiment.

Landmarks need to be recognizable from both the DFOS data and GIS maps, such that they can serve as “anchor” points bridging the physical world and digital world. Some examples of the landmarks include central office (with location often known), manholes, utility poles, bridges, etc. On one hand, the GPS coordinates of those landmarks can be extracted from a third-party GIS system (e.g., KMZ file, good map, openstreetmap API etc.). On the other hand, there exists several machine learning methods which could automatically identify “landmarks” from DFOS waterfall data, based on ambient data collected from DFOS. However, it is unclear how to match the detected landmarks back to the landmarks on a real-world map, such that the correct GPS coordinates can be obtained. If there were errors in the existing cable map, we would like to automatically correct it using DFOS and AI techniques.

An often-overlooked piece is that, from DFOS data, we can also extract many side information, including the cable type (aerial or buried cable), road type (busy road or quiet road), traffic speed limit and volume, turns of traffic at intersections. This information is high-level and vague, by itself, it is not sufficient to solve the cable mapping problem, but it can provide useful constraints to make the final landmark matching results more accurate.

Herein, we describe an evolutionary strategy-based landmark matching approach as an automatic solution for cable geo-localization and route error correction. The proposed approach is based on multiple-point joint matching algorithmic framework and derivative-free policy optimization method, which is able to solve the one-sided perfect matching problem, taking into account various physical constraints, and utilizing side information from traffic sensing. All under the same algorithmic framework that is generic, configurable to accommodate different routes situations. Several uncertainty and indeterminacy factors in cable mapping are identified and solved jointly.

Traditional methods in cable mapping such as GPS-vehicle tracking solves a one-to-one matching problem in which the target location is densely covered with much less ambiguity, but the process is labor intensive. To eliminate the necessity of fieldwork, we use landmark detected from ambient DFOS sensing data, but we need to solve a multiple-to-multiple landmark matching problem. There could be multiple feasible assignments with some inherent indeterminacy due to the nature of fiber sensing as a linear sensing method.

By jointly matching multiple landmark points identified from DFOS sensing data to the GIS map, we do not have to strictly adhere to the guided route on the KMZ file. We can achieve automatic map correction, which makes our method more error-tolerant.

We note at this point several particularly inventive aspects of our present disclosure.

Multiple type of landmarks with side information: we solve the cable mconditionsroblem using multiple type of landmarks and side information such as traffic condition. We are not constrained to use only one type of landmark as previous work is doing.

Multiple-Point Matching: we can have multiple reference points, and we can match them jointly to a KMZ map. In this case, even if part of the KMZ map is not accurate, we have the opportunity of finding which part is inaccurate. Different from moving source with GPS-tracking, in which the GPS coordinates are densely mapped to the fiber distance, the landmark approach only matches a few pairs of GPS-fiber distance and computes the rest by linear interpolation. It has the advantage of blocking error propagation between landmarks.

Reasoning under uncertainty: this task goes beyond recognition or classification; the process of matching multiple points involves reasoning against uncertainty or inaccuracy. This is accommodated by the proposed evolutionary strategy (ES)-based approach.

Physical Constraints: the solution space to search is huge and combinatorial. The size of this space is significantly reduced by considering various real-world feasibility constraints and the searching process becomes more efficient.

Block-box optimization: the forward assignment process is stochastic, sequential, and non-differentiable. One incorrect assignment may cause large errors for the whole map matching. Therefore, there are a long-lasting effects of actions, make policy gradient methods not appropriate. The proposed ES approach as a block-box optimization provides reasonable solution to overcome these challenges, without the need to know the precise analytic form of the objective function and do backpropagation.

Figure 12:
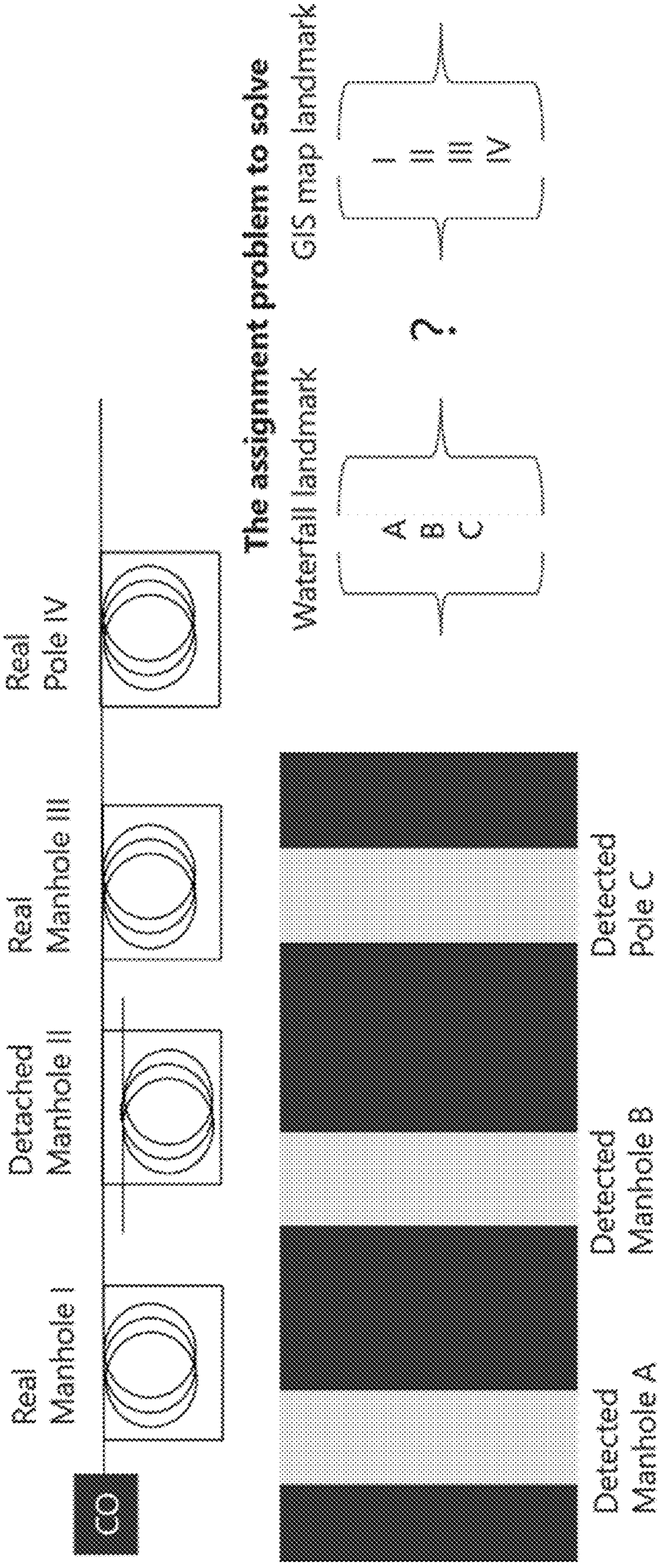
FIG. 12 is a schematic diagram showing an illustrative landmark matching problem in which a cable with slack fiber running through buried and aerial section is evaluated according to aspects of the present disclosure.

FIG. 12 is a schematic diagram showing an illustrative landmark matching problem in which a cable with slack fiber running through buried and aerial section is evaluated according to aspects of the present disclosure.

FIG. 13 is a schematic diagram showing an illustrative assignment matrix according to aspects of the present disclosure.

In this example, 3 manholes and 1 pole appear on the map. Landmarks I, III, IV are on the cable route, II is from a different route. Landmark A, B, C are detected from waterfall. We need to solve a Multiple-Point Matching Problem in Cable Mapping.

Problem Formulation: we would like establish a mapping between fiber distances (column indices) and GPS locations, such that:

The inferred cable route from waterfall is close to the KMZ route (but we may not want them to be exactly the same, since KMZ might be inaccurate).

The inferred cable route or landmarks do not violate various constraints (nodal attribute, edge attribute).

To be more specific, given an unordered list of candidate symbols from KMZ,

Map Landmark=[CO, M1, M2, P1, P2, P3, M3, M4, M5 . . . ], and an ordered list of detected landmarks from waterfall, Detected Landmark=[CO, Ma, Pa, Pb, Mb, Mc . . . ].

We want to find an assignment, such that the Fiber route is close to the guided KMZ route, and it satisfies various validation constraints. The end goal of finding the assignment matrix.

The physical constraints include:

Injective constraint: two symbols cannot be mapped to the same target.

Class type constraint: only symbols within the same class can be assigned.

Distance constraint: cable distance>physical distance for all pairs. i.e., WaterfallDistance(A, B)>=PhysicalDistance(I, II).

Side information constraint: busy/quiet road. For example, traffic data implies busy road or quiet road. Sometimes, road type information is also available as local guidance. Aerial or buried information can be obtained by running a classifier.

We now identify several uncertainties and indeterminacies in the cable mapping application.

Figure 14:
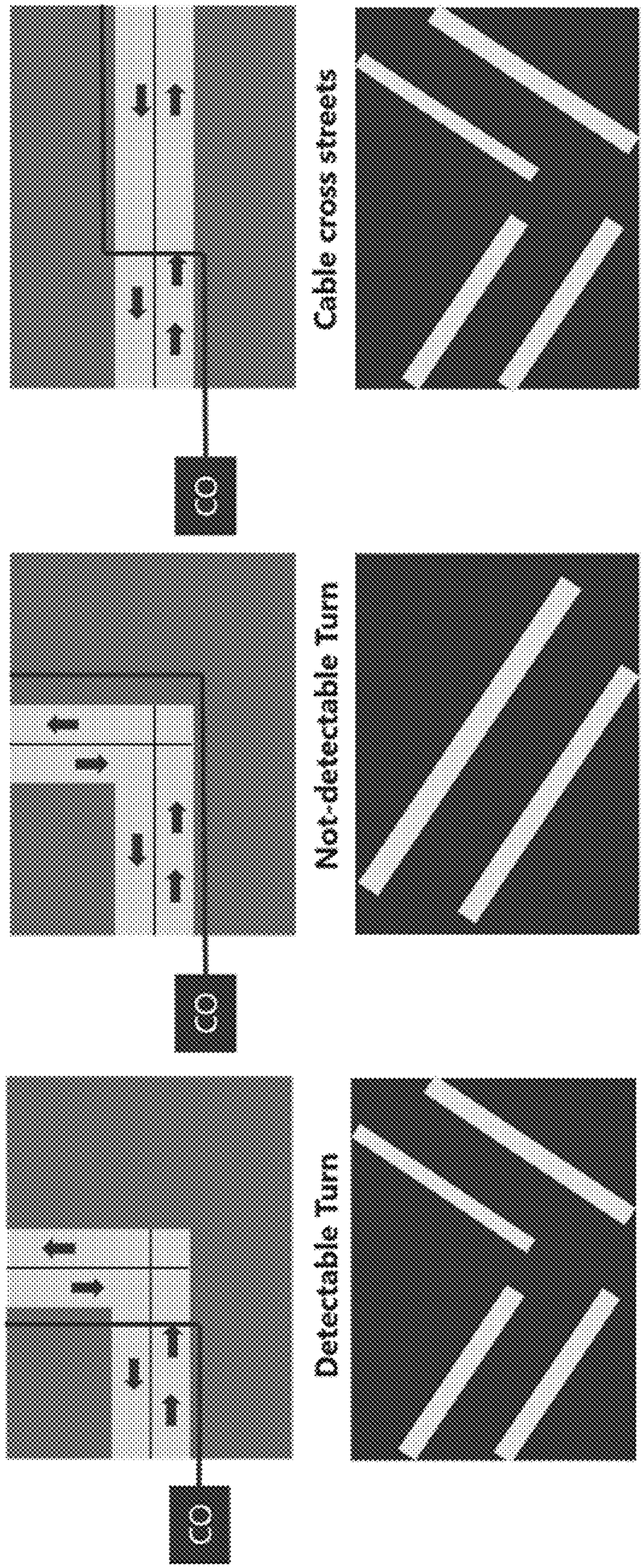
FIG. 14 is a schematic diagram showing an illustrative cable changing directions around an intersection or street crossing. Depending on the direction of traffic and direction of a laser pulse inside the cable, some turns are detectable, and some are not detectable. Cable cross street pattern could be indistinguishable from cable turns at intersection according to aspects of the present disclosure.

FIG. 14 is a schematic diagram showing an illustrative cable changing directions around an intersection or street crossing. Depending on the direction of traffic and direction of a laser pulse inside the cable, some turns are detectable, and some are not detectable. Cable cross street pattern could be indistinguishable from cable turns at intersection according to aspects of the present disclosure.

Figure 15:
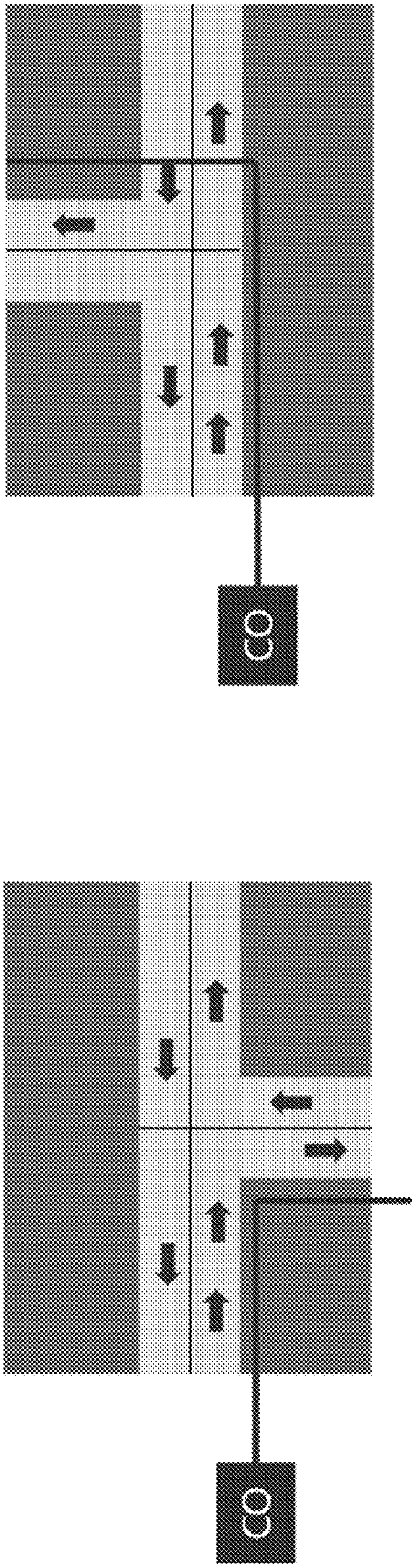
FIG. 15 is a schematic diagram showing an illustrative indeterminates of direction of turns according to aspects of the present disclosure.

FIG. 15 is a schematic diagram showing an illustrative indeterminates of direction of turns according to aspects of the present disclosure.

As is shown in FIG. 14, we may not be able to identify the location of turns from waterfall. Even if we do, we cannot decide the direction of turns by analyzing a single location alone, as illustrated in FIG. 15.

These uncertainties and indeterminacies are ruled out by the multiple-point matching jointly with the guidance of KMZ map. The algorithm will be explained in detail below.

The use of multiple type of landmarks with side information for multiple-point matching, makes the proposed approach error tolerant and uncertainty-aware. The evolutionary strategy is particular suitable for landmark matching, since it does not require (1) known the precise analytic form of the route closeness function (2) backpropagation for assignment optimization, and (3) it does not have the long-last effect of historical actions. We designed a sequential assignment procedure with dynamic mask construction that can flexibility take into account various physical constraints. The steps are as follows.

Step 1: Design of objective function: The larger part of the bipartite graph (KML landmarks) has n vertices, and the smaller part (waterfall landmarks) has r<n vertices. The goal is to find a minimum-cost matching of size exactly s=r, in which the graph admits a one-sided-perfect matching. The cost is defined as how route determined by the KMZ guidance close to the route determined by the matched symbols (discretized uniformly)

Figure 16:
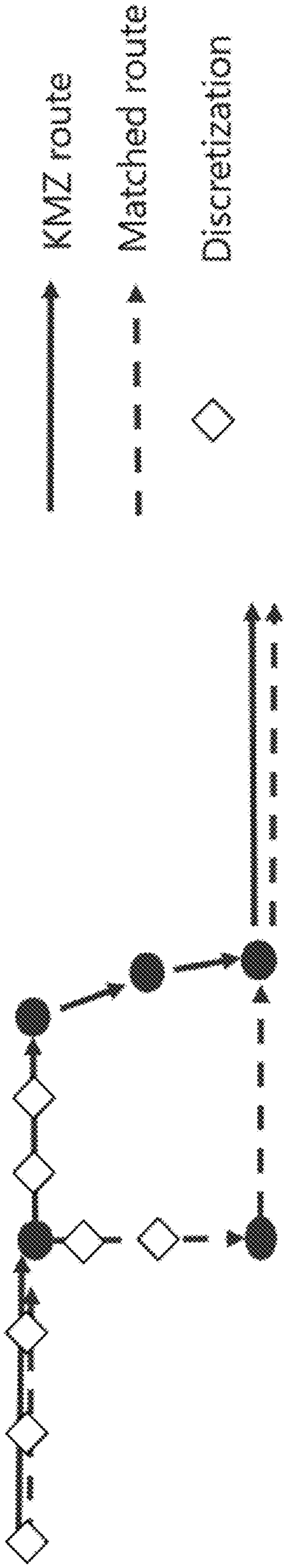
FIG. 16 is a schematic diagram showing an illustrative objective function for evaluating the closeness between the inferred route and the guided KMZ route according to aspects of the present disclosure.

FIG. 16 is a schematic diagram showing an illustrative objective function for evaluating the closeness between the inferred route and the guided KMZ route according to aspects of the present disclosure.

Figure 17:
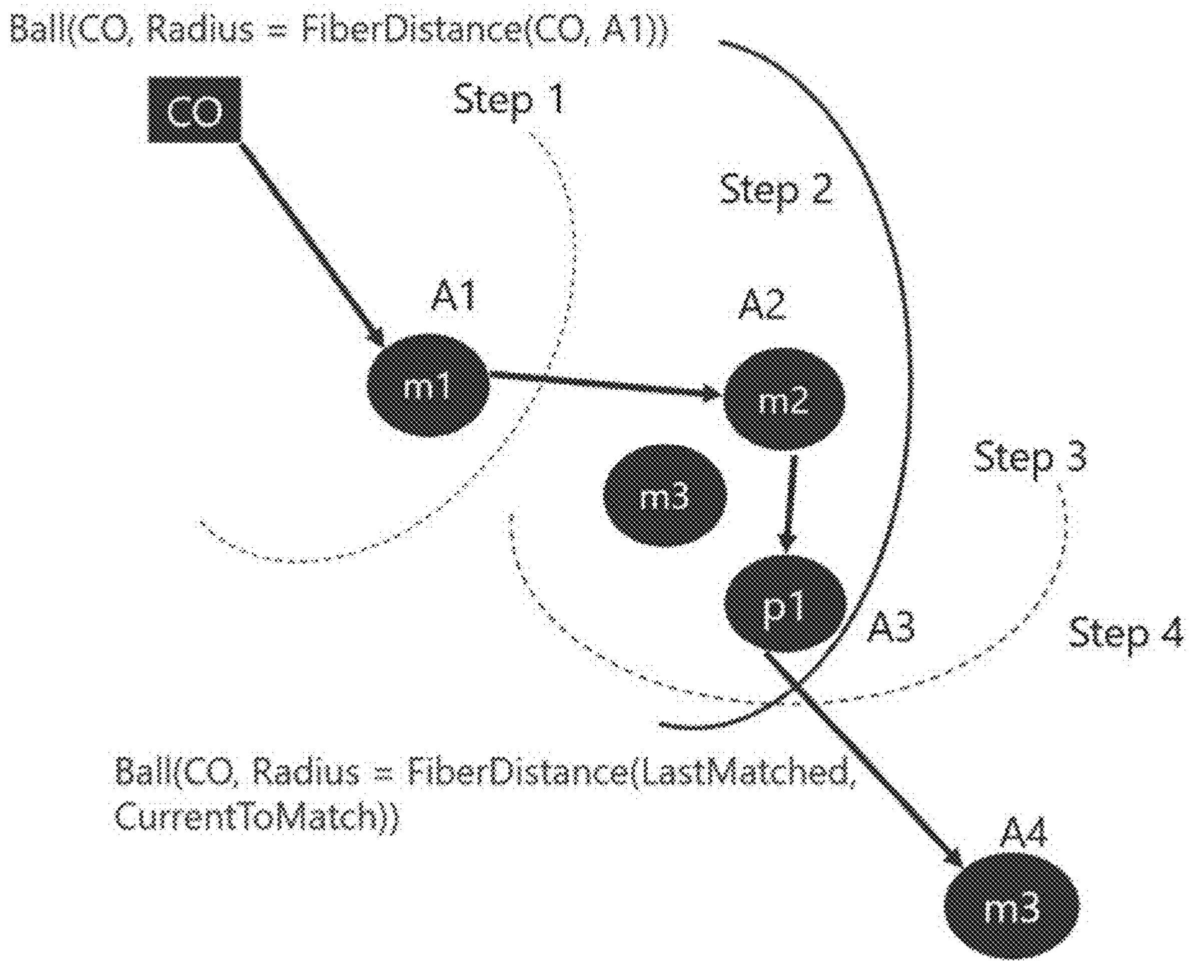
FIG. 17 is a schematic diagram showing illustrative dynamic mask generating processing according to aspects of the present disclosure.

FIG. 17 is a schematic diagram showing illustrative dynamic mask generating processing according to aspects of the present disclosure.

Step 2: Forward proposal generation: Assuming M detected landmarks need to be assigned to a subset of the N map landmarks. For each m detected landmarks, there is a categorical variable with N levels denoting the assignment. For m=1:M, categorical random variables are drawn sequentially, with parameter theta of size M by N. We construct a dynamic mask (detailed in FIG. 17) to ensure (1) assignment without replacement, (2) satisfies the distance constraint, and (3) type matches. After the assignment, the proposal is evaluated by computing the loss=distance (mapped route, guided route) based on FIG. 16.

Rule 1 (Physical constraint): Candidate landmark needs to be within the radius range of a ball, centered at the previous assign location, and the radius to be the fiber distance between The last assigned point, and the current symbol to match on the waterfall. For example, in FIG. 17, after A1 mapped to m1, m2 and m3, p1 are feasible.

Rule 2 (Avoid duplicated assignment): Candidate landmarks are from unassigned only. For example, in FIG. 17, m1 is occupied by previous assignment.

Figure 18:
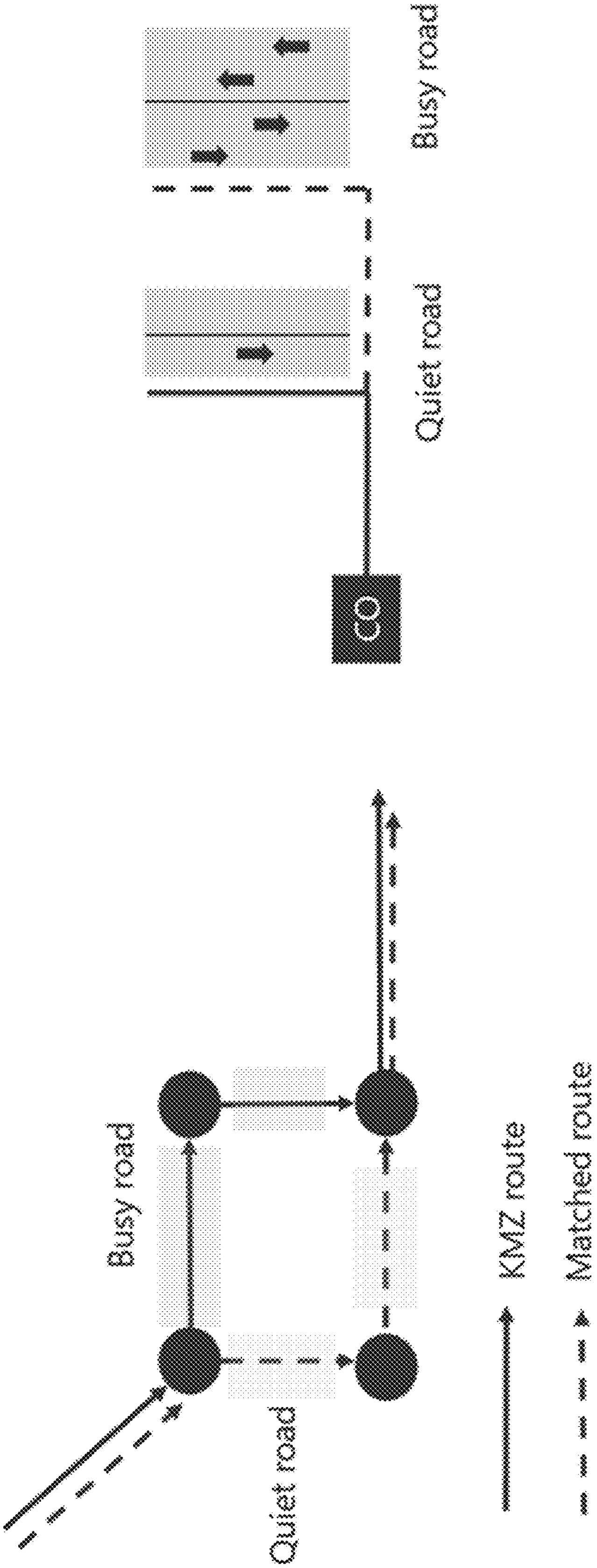
FIG. 18 is a schematic diagram showing an illustrative two possible routes that can be detected based on auxiliary traffic condition information according to aspects of the present disclosure.

Rule 3 (Type aligns): Candidate landmark needs to be within the same type. For example, in FIG. 17, p1 is a pole. Only m2 and m3 are eligible candidate Step 3: Side information incorporation: Side information from local guidance or traffic sensing can aid the decision. They can be added as hard constraint, or soft constraint thus optimized as an auxiliary objective function. If the KMZ route is not 100% correct, between the inferred route and the guided KMZ route in Step 1 may not reach zero. In this scenario, the cable attributes such as Busy or non-busy Traffic, Aerial or Buried can force the correction, as is shown in FIG. 18, which is a schematic diagram showing an illustrative two possible routes that can be detected based on auxiliary traffic condition information according to aspects of the present disclosure.

Figure 19:
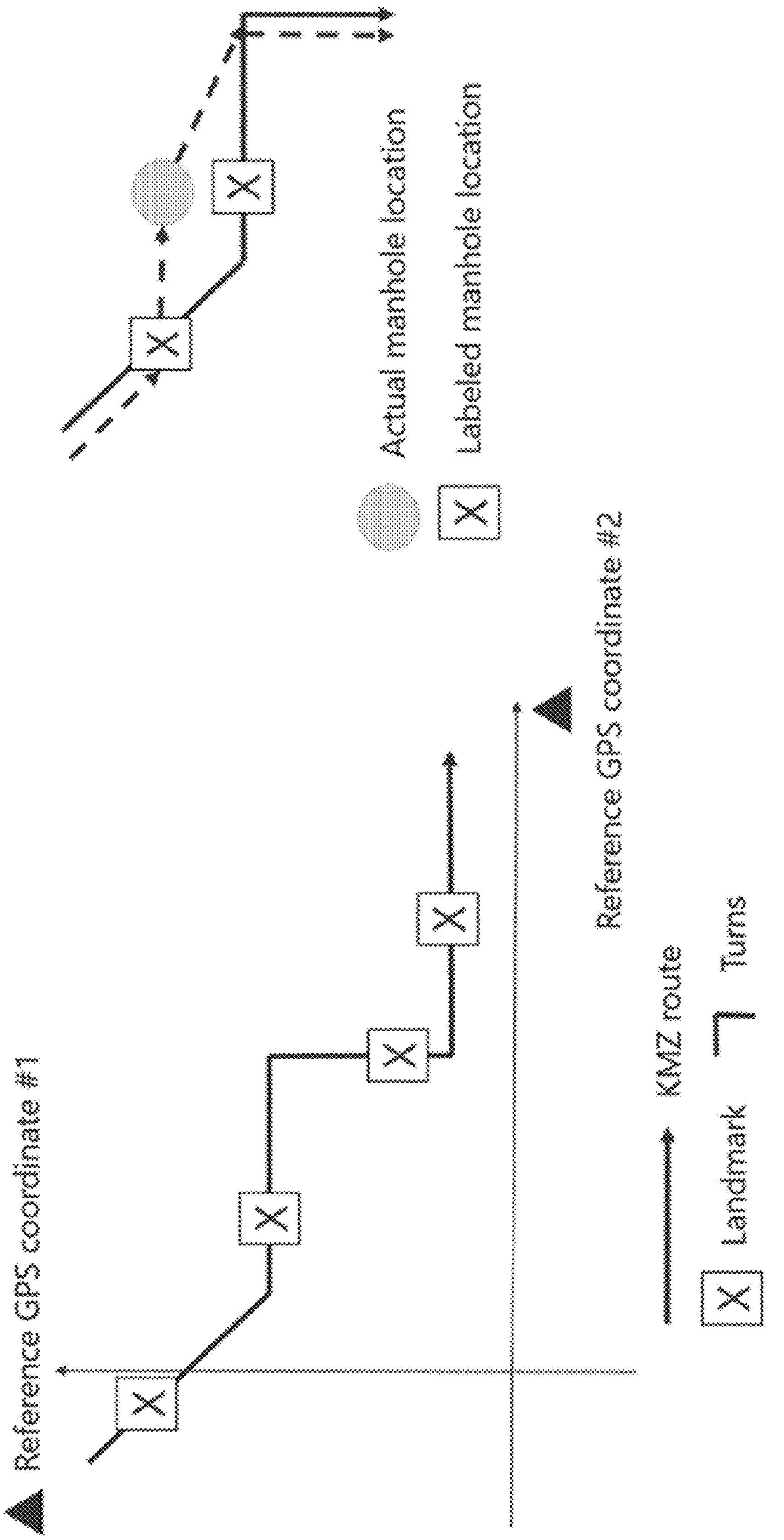
FIG. 19 is a schematic diagram showing: Left—landmark recognition from KMZ map and GPS coordinate interpolation, and Right—due to zoom in resolution when map creator placing the symbols There could be another source of inaccuracy on the map caused by arbitrary zoom-in, zoom-out according to aspects of the present disclosure.

Step 4: Get GPS for landmarks by image processing: landmark symbols or turns of the guided route can be detected from 2D satellite images by object detection or image processing template matching methods. Given the GPS coordinate of two reference points covering the region, the GPS coordinates for the rest of the points of interest can be computed by linear interpolation. As is shown in FIG. 19, which is a schematic diagram showing: Left—landmark recognition from KMZ map and GPS coordinate interpolation, and Right—due to zoom in resolution when map creator placing the symbols There could be another source of inaccuracy on the map caused by arbitrary zoom-in, zoom-out according to aspects of the present disclosure, there could be another sources of map inaccuracy caused by the resolution when placing symbols on the map, and it can be corrected by exacting landmarks from images and calculate the GPS coordinate as opposed query a look-up table.

Step 5: Landmark Matching Based on Evolutionary Strategies

Figure 20B:
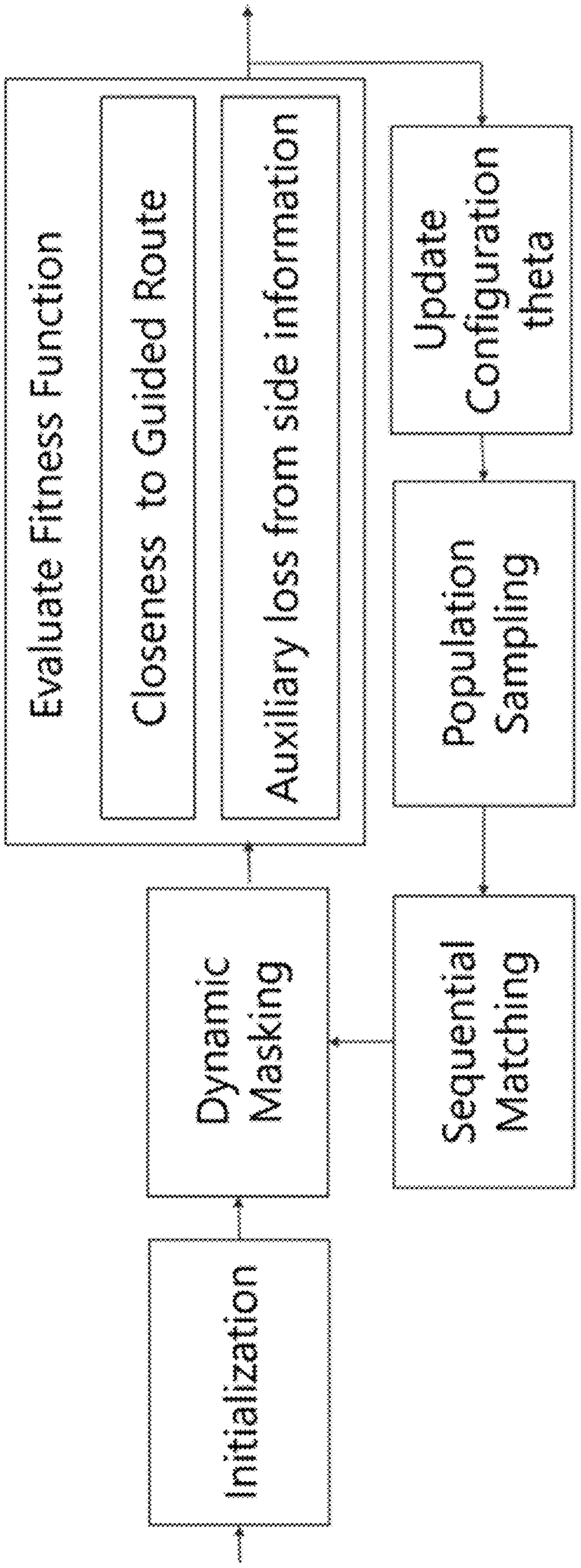

FIG. 20(A) and FIG. 20(B) show landmark matching based on evolutionary strategies in which: FIG. 20(A) is a is a pseudocode listing; and FIG. 20(B) is a flow diagram of ES-based landmark matching, according to aspects of the present disclosure.

Figure 21A:
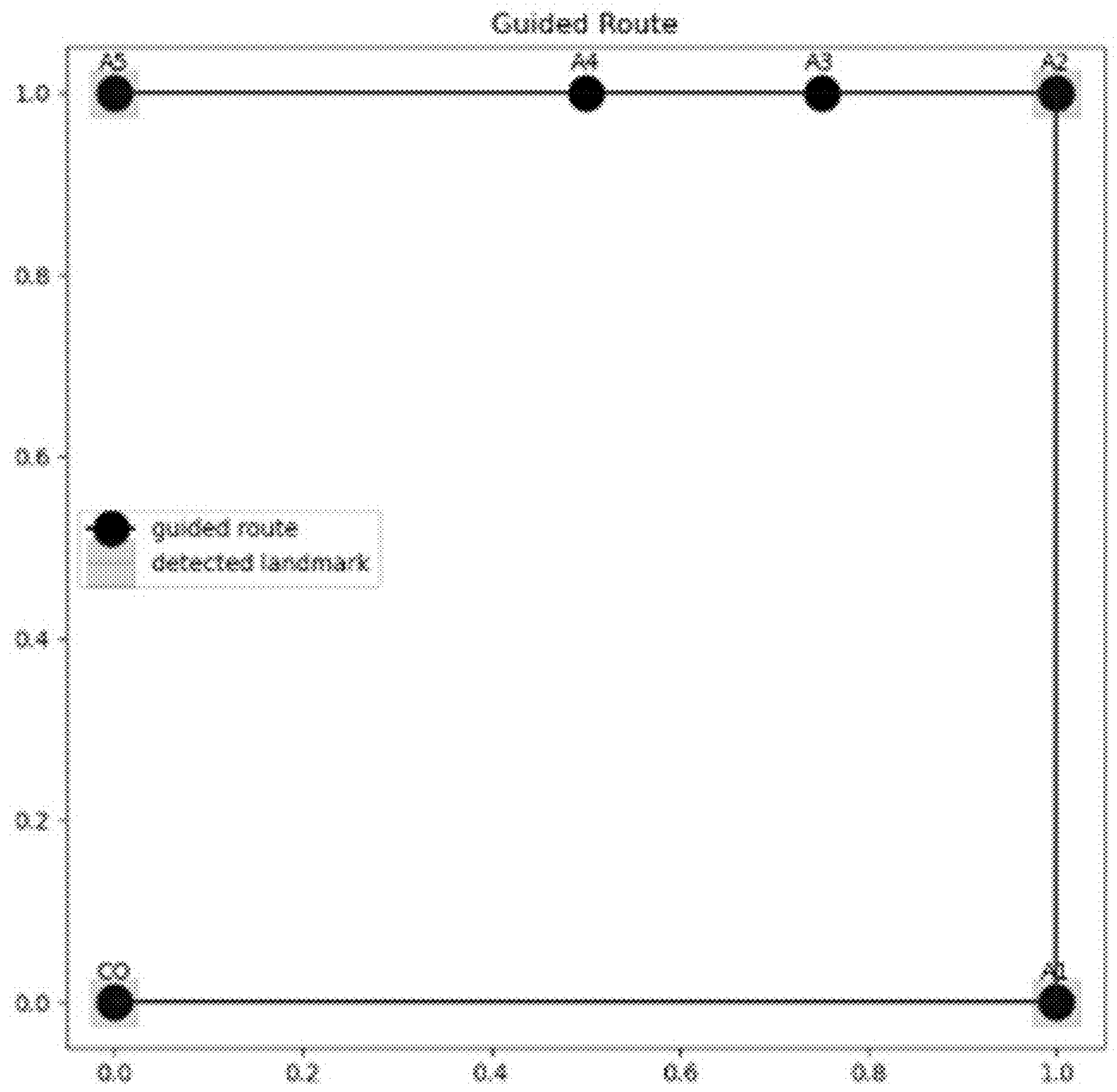
FIG. 21(A), FIG. 21(B), and FIG. 21(C) are plots showing simulation examples illustrating the effectiveness of our ES-based landmark matching algorithm as compared against brute-force random search. Among the 6 candidate landmarks, 4 of them are detected. The route reaches zero loss only if the 4 landmarks are mapped to the correct subset and in the right order, according to aspects of the present disclosure.
Figure 21B:
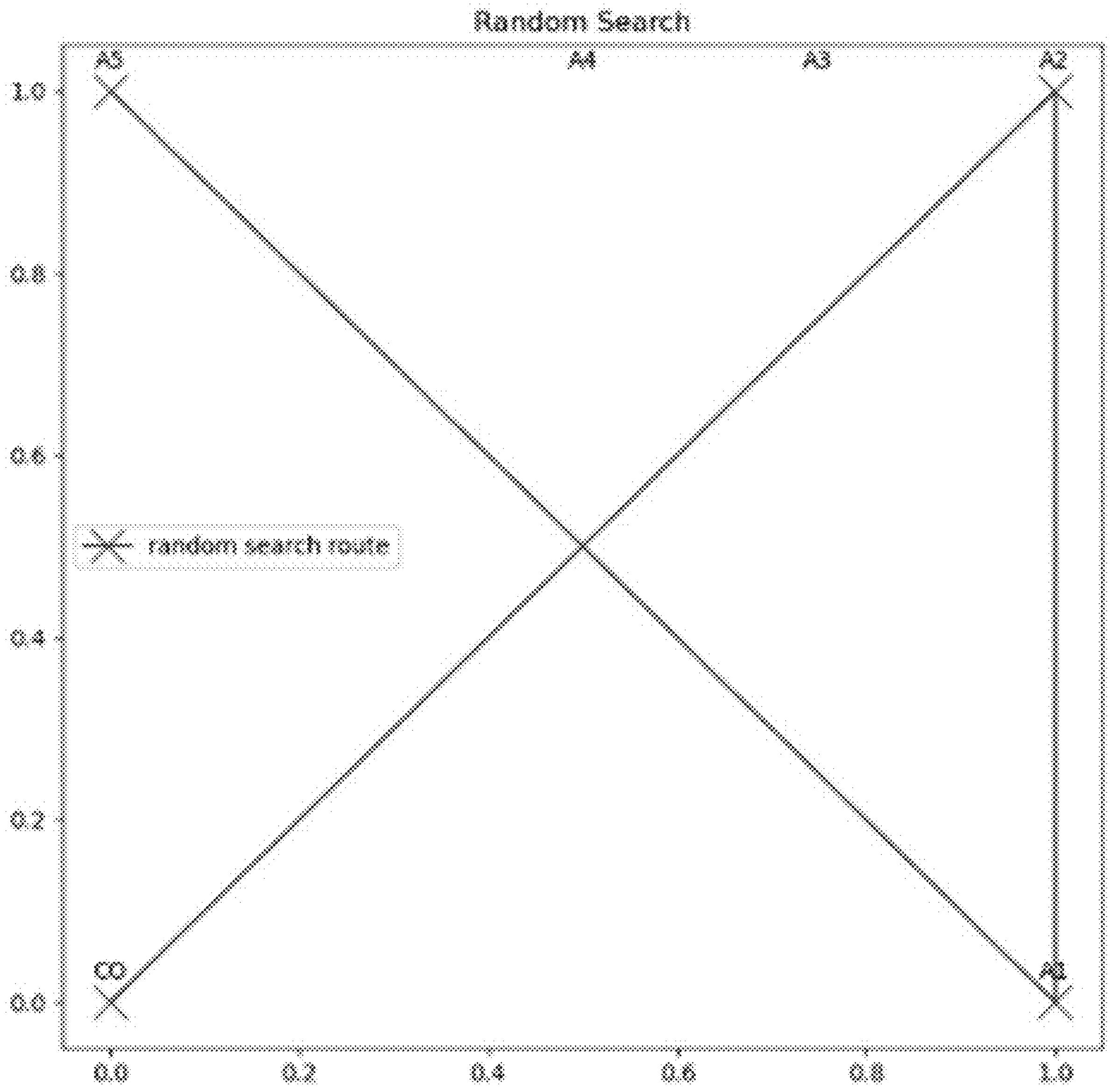
Figure 21C:
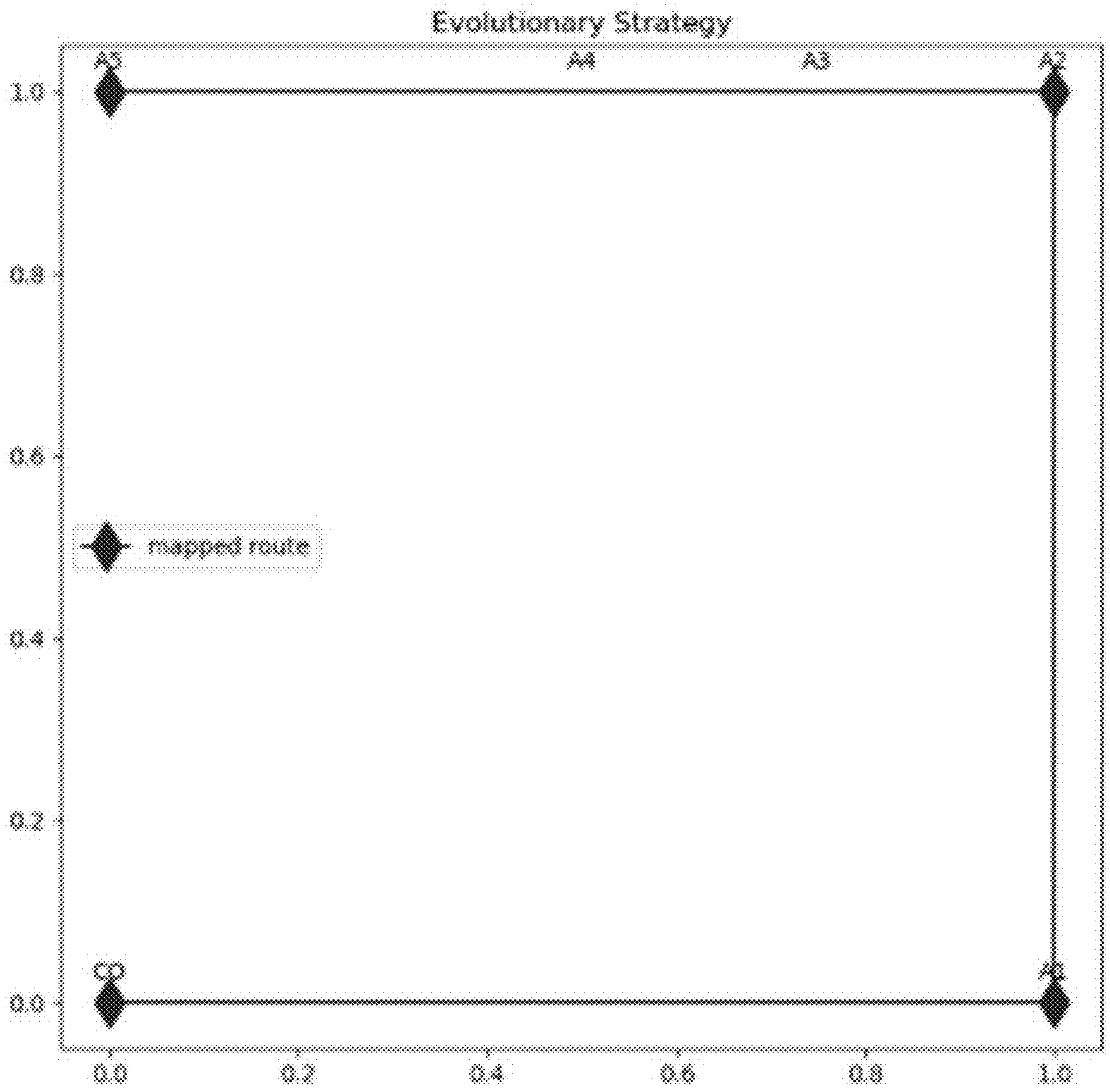

Preliminary results on simulation experiment are demonstrated in FIG. 21(A), FIG. 21(B), and FIG. 21(C) are plots showing simulation examples illustrating the effectiveness of our ES-based landmark matching algorithm as compared against brute-force random search. Among the 6 candidate landmarks, 4 of them are detected. The route reaches zero loss only if the 4 landmarks are mapped to the correct subset and in the right order, according to aspects of the present disclosure.

While we have presented our inventive concepts and description using specific examples, our invention is not so limited. In particular, we showcase application of our inventive approach in unsupervised landmark detection for automatic cable mapping. Meanwhile, it can also be used as a generic pre-processing, data compression and annotation tool upon which downstream machine learning models can be built. Accordingly, the scope of our invention should be considered in view of the following claims.

The invention claimed is:

1. A differentiable rendering method for distributed fiber optic sensing (DFOS) comprising:

input waterfall data produced by DFOS as a grey-scale image array;

divide each image in the grey-scale image array into 16×16 grids and randomly initialize 3 strokes for each grid;

prepare a set of target images from input images;

generate iterative optimization through differentiable render in which initialized primitives are passed through a differentiable render to generate a 2d image as a generated image;

remove, in stroke-space, strokes having a transparency below 0.45 or a length less than 10;

generate a skeleton for each connected component; and determine spatiotemporal events for each generated skeleton.

2. The method of claim 1 in which each stroke is parameterized a Cubic Bezier curve with four control points and one additional parameter for intensity.

3. The method of claim 2 wherein the set of target images are prepared by binarizating original input data and removing components having a pixel count less than 20.

4. The method of claim 3 in which the generated image is masked to emphasize spatiotemporal alignment.

5. The method of claim 4 in which the generated skeleton emphasizes a shape of a vibration pattern including speed and acceleration of vehicles on a spatiotemporal map.

* * * * *